U nited States Patent Office 3,441,347
Patented Apr. 29, 1969

3,441,347
APPARATUS FOR PRODUCING REFLEX COPIES
Wolfgang Lassig, Cologne-Stammheim, and Wolfgang Ludloff, Porz-Westhoven, Germany, assignors to Agfa Aktiengesellschaft, Leverkusen, and Gesellschaft fur Multiblitzgerate Dr. Ing. D.A. Mannesmann G.m.b.H., Porz-Westhoven, Germany, both corporations of Germany
Filed May 19, 1965, Ser. No. 457,023
Claims priority, application Germany, June 4, 1964, A 46,218
Int. Cl. G03b 27/22
U.S. Cl. 355—104        6 Claims

ABSTRACT OF THE DISCLOSURE

Flash apparatus for thermal copying has a flash tube of 600 to 1,000 watt-seconds power input and a flash time of $10^{-3}$ to $10^{-4}$ seconds, using a single flash to copy an image 20 by 32 centimeters with reflex exposure. Flash tube is surrounded by transparent cylinder around which sheet having image to be copied is carried by automatically operated belt driven by motor that is energized when the sheet is introduced into a feed slot, and automatically deenergized when the belt has carried the sheet a complete revolution around the cylinder. A step-down cam automatically flashes the tube after half a revolution. Flashing is effected by condenser charged from secondary of a power transformer, a voltage doubling circuit being used to get the charging voltage up to about twice that available at the secondary. Charging is terminated by opening a switch combination at the capacitor when a sampled voltage produces a discharge in a glow lamp, and the switch combination is automatically held open once the sheet has passed through the feed slot, so that the next charging to flashing voltage does not take place until the next sheet is introduced.

---

This invention relates to an apparatus for the production of reflex copies by flash exposure.

Thermal copying processes in which no aqueous treatment baths are used, are known per se. In such processes heat-sensitive material are used which are colorless, but which produce a colored image at the heated area due to the initiation of a color-producing chemical reaction. It has already been proposed to apply the conventional reflex exposure for these processes. The reflex exposure can be performed in different types of apparatus in which the copying material is exposed to the light of a high-energy electronic flash. Due to the very high light energy which is required for the known heat-sensitive materials, the copying material has to be exposed in strip form in order to keep the dimensions, both of the electronic flash tube and of the electric part of the apparatus, within reasonable limits. Accordingly, the flash frequency has to be synchronized with the speed at which the coplying material travels through the apparatus, and this is very expensive because of the additional mechanical and electrical control elements which are required. Devices of this type are only of limited practical use.

The object of the present invention is to provide an apparatus which is suitable for processing light-sensitive materials by reflex exposure and which obviates the disadvantages of the apparatus referred to above in that originals of fairly large size, for example, a sheet of 20 x 32 cm. may be copied by a single exposure rather than being copied striplike by a sequence of several exposures.

The above object has been attained by providing an apparatus with an exposure element comprising a flash tube with a power input of 600 to 1,000 watt-seconds and a flash time of $10^{-3}$ to $10^{-4}$ seconds, preferably between $10^{-3}$ and $2 \times 10^{-4}$ seconds. The apparatus also includes means for stabilizing the light output and externally operable means for controlling the energy, as well as control elements by means of which the copying process may be automatically performed. Thus, for example, the charging of the storage capacitor for the flash tube may be initiated by a suitable control mechanism as soon as the paper is fed in. Another control mechanism triggers the flash when the entire original is ready for copying, so that the capacitor remains uncharged when not in use.

The flash tube is arranged in the middle of a glass cylinder. When the copy is being made, the combination of original and copying material is so arranged on the outside of the glass cylinder that the heat-sensitive copying materials face towards the flash tube.

According to a preferred embodiment of the invention, the glass cylinder is internally provided with a coating of a non-reflecting material of a type which is known from the literature.

Finally, glass cylinders are preferably used with reflecting inside surfaces on the circular end faces.

Figure 1:
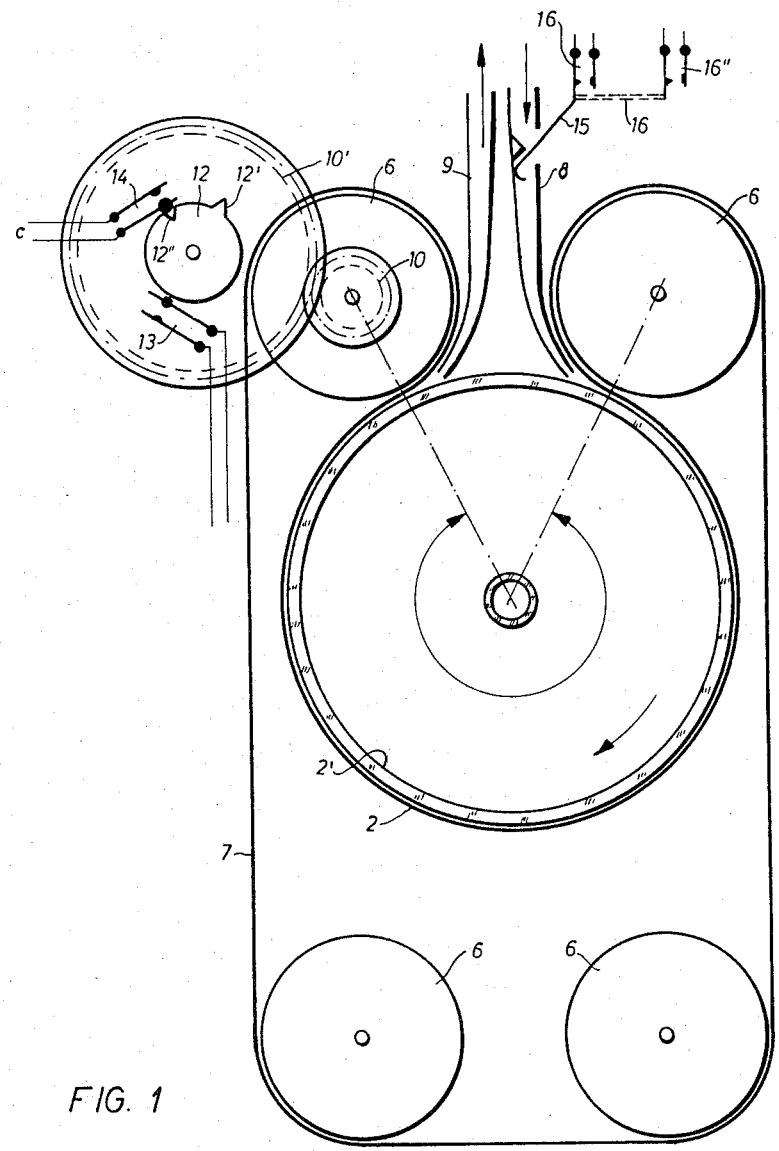
Figure 2:
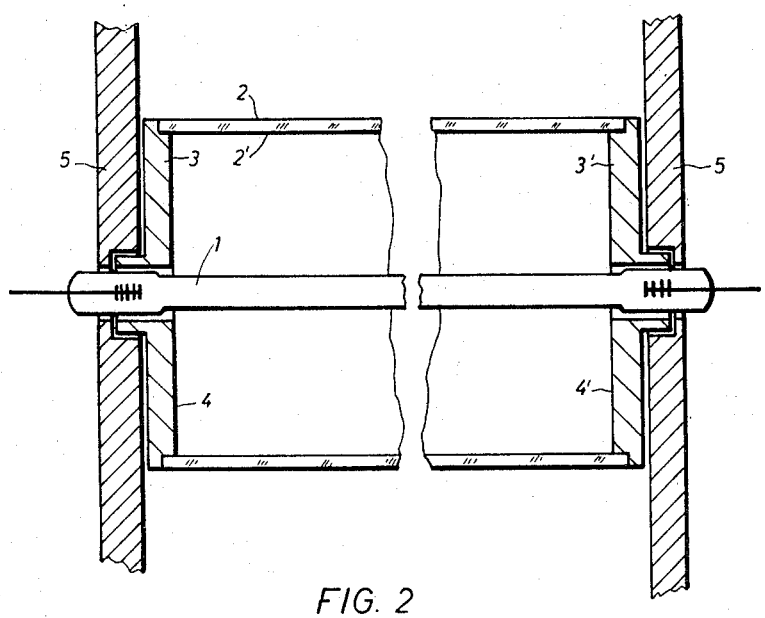

Referring now to FIGURES 1 and 2 the exposure apparatus here shown comprises a straight, high-voltage flash tube 1, having a very short flash of $10^{-3}$ to $10^{-4}$ preferably to $2 \times 10^{-4}$ seconds ($\frac{1}{1000}$–$\frac{1}{5000}$ seconds), which is arranged along the axis of a surrounding glass cylinder 2. The dimensions of the outer surface of the glass cylinder 2 preferably correspond to a size of about 20 by 30 cm. The inner surface 2' of a glass cylinder 2 is covered with a non-reflecting layer. The ends of the glass cylinder 2 are closed by bearings 3, 3' having reflecting inner surfaces 4, 4' which considerably improve the light yield. The bearings 3, 3' are rotatably mounted in a housing denoted by 5, so that the glass cylinder 2 is able to rotate around the fixed flash tube 1.

The glass cylinder 2 is surrounded by an endless conveyor belt 7 which is guided over rollers 6. The copying materials together with the original is introduced between the conveyor belt 7 and the glass cylinder 2 through a slot 8. The conveyor belt 7 or one of the guide rollers 6 is rotated by a driving motor (not shown) so that the copying material together with the original is transported around the rotating glass cylinder 2 to an outlet channel 9. A cam disk 12 is driven simultaneously with the conveyor belt 7 and the glass cylinder 2 by reduction gears 10, 10'. The cam disk 12 only makes one complete revolution to each two revolutions made by the glass cylinder 2. A trigger cam 12' on the cam disk 12 operates after half a revolution, which corresponds to one complete revolution of the glass cylinder, a trigger switch 13, which will be described below. After one complete revolution, a switch contact drops into a notch 12'' in the disk 12 and thereby opens a cutout 14. Arranged in the inlet slot 8 is a feeler 15 which is raised by the copying materials and, in being raised, operates a circuit closer 16 with two switch contacts 16' and 16''.

Figure 3:
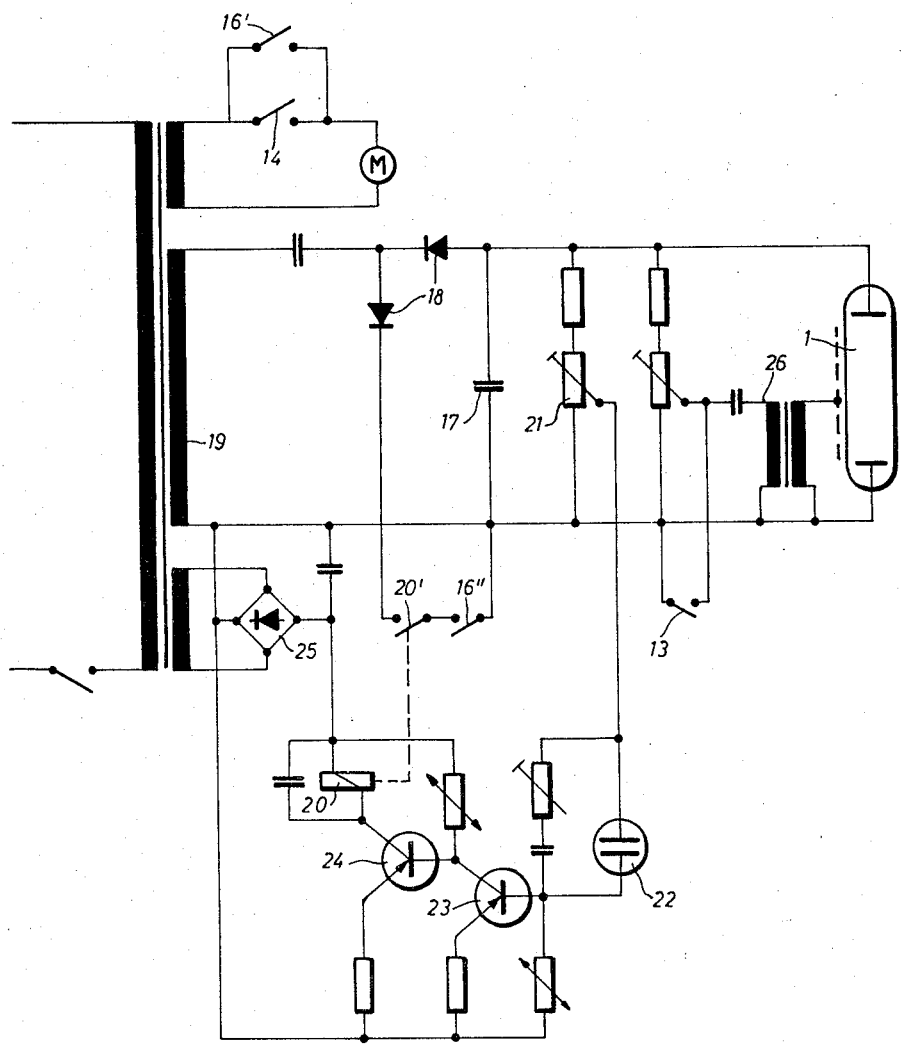

Referring now to FIGURE 3, the electrical circuitry of the embodiment derives its power from an alternating current source which is connected in circuit with the primary windings of a power transformer 19.

The flash tube 1 is connected across a storage capacitor 17 which is charged to high voltage from a secondary step-up winding of the transformer 19 via voltage-doubling rectifiers 18. A relay contact 20' and the switch contact 16'' are connected in series in the charging circuit of the storage capacitor 17. A component of the voltage developed across a stabilizing glow-discharge lamp 22 is tapped off at a variable resistor 21 connected in parallel with the storage capacitor 17. The other side of the glow-discharge lamp 22 is connected to the base of a switch transistor 23 which controls a relay 20 operating the relay contact 20' via a transistor amplifier 24. The relay 20 is fed via a power supply element 25. The driving motor M may be switched on by way of the two switches 14 and 16' connected in parallel with one another.

When the copying material is fed into the inlet slot 8, the driving motor M is switched on by the switch contact 16' so that the conveyor belt 7 guides the copying material together with the original around the glass cylinder 2. At the same time, however, the switch contact 16" is closed so that, when the copying material is introduced into the inlet slot 8, the storage capacitor 17 begins to charge because the relay contact 20' is still closed. The storage capacitor 17 is charged to the required voltage which may be adjusted externally at the variable resistor 21. If the component voltage which is proportional to the required voltage and which is tapped off at the variable resistor 21 is equal to the ignition voltage of the glow-discharge tube 22, this latter lights up. As a result, the switch transistor 23 becomes conductive and controls the relay 20 via the transistor amplifier 24. The relay 20 therefore breaks the charging circuit of the storage capacitor 17 at 20' when a pre-determined desired voltage governing the light output is reached. This stabilizing circuit, which comprises the glow-discharge lamp 22 and the switching transistor 23 is remarkable in so far as the charging circuit is broken on the direct current side behind the voltage-doubling rectifiers 18, so that the relay contact 20' may be opened without any sparking. In addition, the circuit arrangement as described ensures that the storage capacitor 17 is not charged for prolonged periods, but is only charged when copying material is introduced into the aparatus. Because the storage capacitor 17 is only charged for brief periods, a charging voltage above its rated voltage may be provided. The storage capacitor 17 is charged to the stabilized required voltage during the time it takes the glass cylinder 2 to make one revolution. Charging ends when all the copying material has been introduced and covers the outer surface of the glass cylinder 2. At this moment, the switch contacts 16' and 16" are re-opened. The driving motor M, however, continues to run even with the switch contact 16' open, because the switch 14 has meanwhile been closed by the revolution of the cam disk 12. When all the copying material has been introduced, the cam 12', on the cam disk 12 operates the trigger switch 13 which switches on an ignition device 26, known per se, for the flash tube 1. The flash discharge is thus initiated and the copying material is uniformly illuminated over its entire surface. The conveyor belt 7 then removes the copying material together with the original from the apparatus through the outlet channel 9, for which purpose the glass cylinder 2 has to make another complete revolution. The switch contact then drops into the notch 12" in the disk 12 and operates the output 14 to stop the driving motor M.

The apparatus of the invention exhibits particular utility for the reflex exposure of photographic materials which are not sensitive to normal day-light or light of incandescent lamps but which are changed at the lightstruck areas upon imagewise exposure to a short, high-intensity flash exposure. Those materials are characterized by a content of compounds which are capable of absorbing the copying light and converting the light energy into heat energy so that a change of the said layer with regard to its chemical or physical properties is caused by the heat at the exposed areas.

Suitable materials are described for instance in Belgian patent specification 657,505. The said materials are insensitive to normal day-light or light of incandescent lamps. In the layer described in the above reference the original coloring is eliminated upon reflex exposure with an electronic flash at those areas facing the white background of the original, so that a visible direct-positive image of the original is obtained in the layer.

We claim:
1. In an apparatus for the thermal production of photographic copies by reflex exposure of photographic materials to an electronic flash and having means for moving a photographic element sensitive to flash exposure, in contact with the original to be reproduced, around a transparent cylinder surrounding a flash tube extending along the axis of the cylinder, the improvement according to which the outer cylindrical surface of the cylinder is large enough to make copies of 20 by 32 centimeter originals with a single flash, the flash tube has a flash time of $10^{-3}$ to $10^{-4}$ seconds and a power input of between 600 and 1000 watt-seconds, and the inner cylindrical surface of the cylinder is provided with a non-reflecting layer.

2. In an apparatus for the thermal production of photographic copies by reflex exposure of photographic materials to an electronic flash and having means for moving a photographic element sensitive to flash exposure, in contact with the original to be reproduced, around a transparent cylinder surrounding a flash tube extending along the axis of the cylinder, the improvement according to which the outer cylindrical surface of the cylinder is large enough to make copies of 20 by 32 centimeter originals with a single flash, the flash tube has a flash time of $10^{-3}$ to $10^{-4}$ seconds and a power input of between 600 and 1000 watt-seconds, and the cylinder is carried by cylinder ends having reflective inner surfaces.

3. In an apparatus for the thermal production of photographic copies by reflex exposure of photographic materials to an electronic flash and having means for moving a photographic element sensitive to flash exposure, in contact with the original to be reproduced, around a transparent cylinder surrounding a flash tube extending along the axis of the cylinder, the improvement according to which the outer cylindrical surface of the cylinder is large enough to make copies of 20 by 32 centimeter originals with a single flash, the flash tube has a flash time of $10^{-3}$ to $10^{-4}$ seconds and a power input of between 600 and 1000 watt-seconds, the inner cylindrical surface of the cylinder is provided with a non-reflecting layer, and the cylinder is carried by cylinder ends having reflective inner surfaces.

4. In an apparatus for the thermal production of photographic copies by reflex exposure of photographic materials to an electronic flash and having means for moving a photographic element sensitive to flash exposure, in contact with the original to be reproduced, around a transparent cylinder surrounding a flash tube extending along the axis of the cylinder, the improvement according to which the outer cylindrical surface of the cylinder is large enough to make copies of 20 by 32 centimeter originals with a single flash, the flash tube has a flash time of $10^{-3}$ to $10^{-4}$ seconds and a power input of between 600 and 1000 watt-seconds, and the moving means includes an impelling motor that moves the photographic element around the cylinder as well as automatic controls connected to (a) flash the flash tube when the photographic element has moved half way around the cylinder and (b) terminate the energization of the motor when the photographic element has moved entirely around the cylinder.

5. In automatically operated photographic flash exposing apparatus having a control mechanism connected for automatically feeding material to be exposed to exposing position around a flash tube while charging a flashing capacitor, and then automatically flashing the tube by discharging the capacitor through it, the improvement according to which the control mechanism includes charge-limiting switch means connected to automatically open the charging circuit at the capacitor when the capacitor is adequately charged, and further connected to hold the charging circuit open at that location until the next exposure is to be made.

6. The combination of claim 5 in which the apparatus has a voltage-doubling charging circuit with a transformer secondary bridged by a charging capacitor in series with a first rectifier, and that rectifier is in turn bridged by a second rectifier in series with the flashing capacitor, and the charge-limiting switch means is in the connection between the first rectifier and the transformer secondary.

References Cited

UNITED STATES PATENTS

| | | |
|---|---|---|
| 2,204,297 | 6/1940 | Brunk. |
| 2,428,357 | 10/1947 | Cohen et al. _ _ _ _ _ _ 350—164 X |
| 3,056,904 | 10/1962 | Kotz et al. _ _ _ _ _ _ _ _ _ 95—75 X |

NORTON ANSHER, *Primary Examiner.*

M. H. HAYES, *Assistant Examiner.*